United States Patent
Excoffier et al.

(10) Patent No.: US 8,751,549 B2
(45) Date of Patent: Jun. 10, 2014

(54) PERSISTENT DATA MANAGEMENT IN MULTI-IMAGE CODE LOAD SYSTEMS

(75) Inventors: Franck Excoffier, Tucson, AZ (US);
Michael Paul Groover, Vail, AZ (US);
Michael Robert Groseclose, Jr.,
Tucson, AZ (US); Xu Han, Lincoln, CA
(US); Mario Kiessling, Oregon City, OR
(US); Yang Liu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 113 days.

(21) Appl. No.: 13/344,728

(22) Filed: Jan. 6, 2012

(65) Prior Publication Data

US 2013/0179478 A1 Jul. 11, 2013

(51) Int. Cl.
*G06F 12/00* (2006.01)
*G06F 17/30* (2006.01)

(52) U.S. Cl.
USPC .......................................... 707/822; 707/823

(58) Field of Classification Search
CPC .............. G06F 21/575; G06F 21/6218; G06F 2221/2107; G06F 17/30265; G06F 17/30879; G06F 21/00
See application file for complete search history.

(56) References Cited

U.S. PATENT DOCUMENTS

| | | | | |
|---|---|---|---|---|
| 6,973,646 | B1* | 12/2005 | Bordawekar et al. | 717/146 |
| 7,823,145 | B1* | 10/2010 | Le et al. | 717/168 |
| 7,870,375 | B2* | 1/2011 | Bayus et al. | 713/1 |
| 2005/0076036 | A1* | 4/2005 | Le | 707/100 |
| 2005/0114685 | A1* | 5/2005 | Blinick et al. | 713/191 |
| 2007/0226730 | A1* | 9/2007 | Coyle et al. | 717/170 |
| 2008/0144471 | A1* | 6/2008 | Garapati et al. | 369/99 |
| 2009/0037514 | A1* | 2/2009 | Lankford et al. | 709/201 |
| 2009/0292737 | A1* | 11/2009 | Hayton | 707/200 |
| 2010/0037206 | A1* | 2/2010 | Larimore et al. | 717/109 |
| 2010/0257523 | A1 | 10/2010 | Frank | |
| 2011/0010344 | A1* | 1/2011 | Sjogren | 707/638 |
| 2011/0066597 | A1 | 3/2011 | Mashtizadeh et al. | |
| 2011/0191299 | A1* | 8/2011 | Huynh Huu et al. | 707/646 |

* cited by examiner

*Primary Examiner* — Tony Mahmoudi
*Assistant Examiner* — Tuan A Pham
(74) *Attorney, Agent, or Firm* — Nelson and Nelson; Daniel P. Nelson; Alexis V. Nelson

(57) ABSTRACT

A method for managing persistent data in a multi-image code load system is disclosed. In one embodiment, such a method includes providing first and second code images for loading onto a computing system. The method stores, in a common repository, persistent data that is shared by each of the first and second code images. When changes are made to the shared persistent data associated with the first and second code images, the changes are recorded in the form of content deltas. When generating such content deltas, the method determines which of the first and second code images the content deltas apply to and marks the content deltas accordingly. A corresponding apparatus and computer program product are also disclosed and claimed herein.

11 Claims, 5 Drawing Sheets

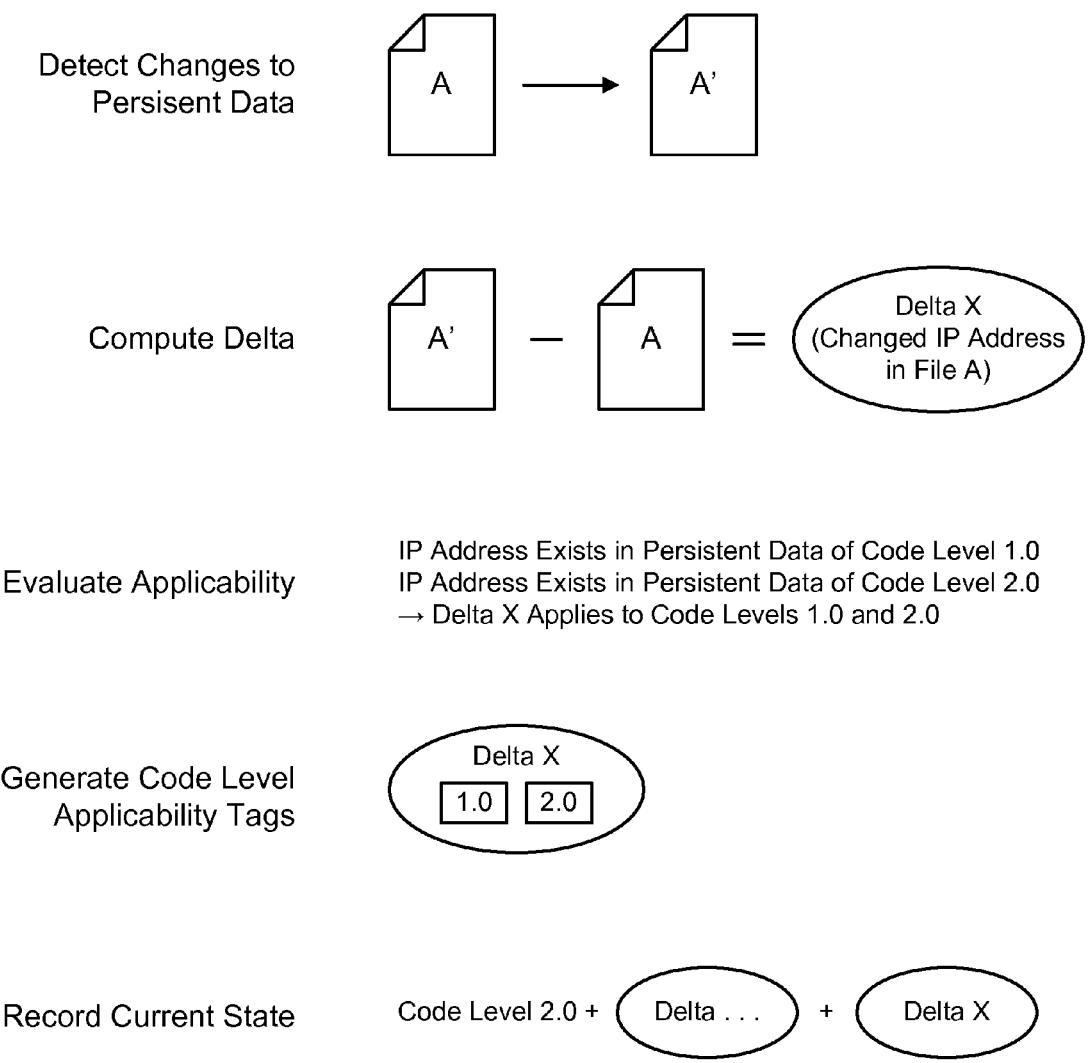

PERSISTENT DATA MANAGEMENT IN MULTI-IMAGE CODE LOAD SYSTEMS

BACKGROUND

1. Field of the Invention

This invention relates to apparatus and methods for managing persistent data in systems that can load multiple code images.

2. Background of the Invention

Multi-image systems are frequently used in enterprise environments to provide a safety net when updating to higher levels of code. Such systems may include two or more repositories (e.g., real or virtual hard drives) storing software or firmware referred to as "images." One image (i.e., the active image) contains an existing code level, while the other image (i.e., the alternate image) contains a new code level. When the new code level is in place on the alternate image, the multi-image system allows the active image to be swapped with the alternate image, thereby allowing the new code level to run in the enterprise environment. If an issue is encountered with the new code level, the system may revert to the previous code level by swapping the images.

One advantage of multi-image update systems is their ability to minimize update and failure recovery time. Embodiments of such systems can be found in operating systems, hypervisor microcode, and even host adapter firmware. Regardless of the embodiment, such systems have to deal with "persistent data." Typically, persistent data refers to information specific to a particular system, such as configuration information.

When dealing with persistent data, conventional multi-image update systems exhibit various deficiencies. For example, compatibility issues may arise between codes levels that use different persistent data formats. In some cases, the compatibility issues may be so severe that a multi-image system cannot be used. One solution for addressing this incompatibility is to overwrite both images. This solution, however, destroys any fallback capability.

Another problem with conventional multi-image update systems is their inability to transfer configuration changes between images. The persistent data associated with each image in a multi-image system is typically not synchronized. This is primarily because there is no guarantee that both code levels can handle the same data format. For this reason, conventional multi-image update systems typically maintain two copies of persistent data instead of a single shared copy. Consequently, if a parameter associated with a first code level is changed, the change will not be reflected in a second code level.

In view of the foregoing, what are needed are apparatus and methods to effectively manage the persistent data of multiple code images. Ideally, such apparatus and methods will be able to synchronize the persistent data of multiple code images even in cases where the code images, or the persistent data formats of the code images, are substantially different.

SUMMARY

The invention has been developed in response to the present state of the art and, in particular, in response to the problems and needs in the art that have not yet been fully solved by currently available apparatus and methods. Accordingly, the invention has been developed to provide apparatus and methods to manage persistent data of multiple code images. The features and advantages of the invention will become more fully apparent from the following description and appended claims, or may be learned by practice of the invention as set forth hereinafter.

Consistent with the foregoing, a method for managing persistent data in a multi-image code load system is disclosed. In one embodiment, such a method includes providing first and second code images for loading onto a computing system. The method stores, in a common repository, persistent data that is shared by each of the first and second code images. When changes are made to the shared persistent data associated with the first and second code images, the changes are recorded in the form of content deltas. When generating such content deltas, the method determines which of the first and second code images the content deltas apply to and marks the content deltas accordingly.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 5 provides a specific example of a method for calculating a content delta.

DETAILED DESCRIPTION

Figure 1:
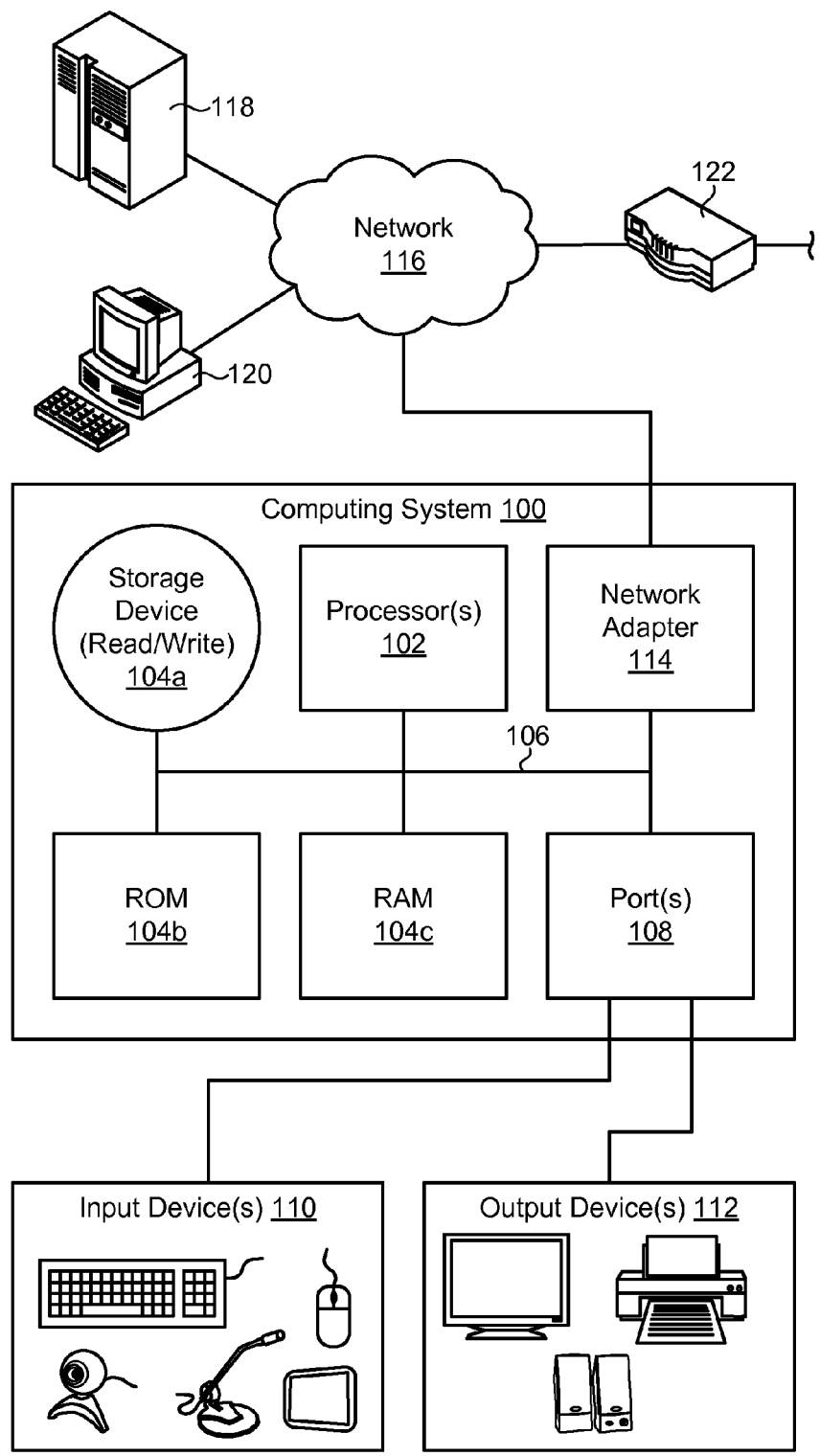
FIG. 1 is a high-level block diagram showing one example of a computing system in which an apparatus and method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

Embodiments of the invention may be described below with reference to flowchart illustrations and/or block diagrams of methods, apparatus, systems, and computer program products. It will be understood that each block of the flowchart illustrations and/or block diagrams, and combinations of blocks in the flowchart illustrations and/or block diagrams, may be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a computing system 100 is illustrated. The computing system 100 is presented to show one example of an environment where an apparatus and method in accordance with the invention may be implemented. The computing system 100 is presented only by way of example and is not intended to be limiting. Indeed, the apparatus and methods disclosed herein may be applicable to a wide variety of different computing systems in addition to the computing system 100 shown. The apparatus and methods disclosed herein may also potentially be distributed across multiple computing systems 100.

As shown, the computing system 100 includes at least one processor 102 and may include more than one processor 102. The processor 102 may be operably connected to a memory 104. The memory 104 may include one or more non-volatile storage devices such as hard drives 104a, solid state drives 104a, CD-ROM drives 104a, DVD-ROM drives 104a, tape drives 104a, or the like. The memory 104 may also include non-volatile memory such as a read-only memory 104b (e.g., ROM, EPROM, EEPROM, and/or Flash ROM) or volatile memory such as a random access memory 104c (RAM or operational memory). A bus 106, or plurality of buses 106, may interconnect the processor 102 and memory devices 104 to enable data and/or instructions to pass therebetween.

To enable communication with external systems or devices, the computing system 100 may include one or more ports 108. Such ports 108 may be embodied as wired ports 108 (e.g., USB ports, serial ports, Firewire ports, SCSI ports, parallel ports, etc.) or wireless ports 108 (e.g., Bluetooth, IrDA, etc.). The ports 108 may enable communication with one or more input devices 110 (e.g., keyboards, mice, touchscreens, cameras, microphones, scanners, storage devices, etc.) and output devices 112 (e.g., displays, monitors, speakers, printers, storage devices, etc.). The ports 108 may also enable communication with other computing systems 100.

In certain embodiments, the computing system 100 may also include a network adapter 114 to connect the computing system 100 to a network 116, such as a LAN, WAN, or the Internet. Such a network 116 may enable the computing system 100 to connect to one or more servers 118, workstations 120, personal computers 120, mobile computing devices, or other devices. The network 116 may also enable the computing system 100 to connect to another network by way of a router 122 or other device 112. Such a router 122 may allow the computing system 100 to communicate with servers, workstations, personal computers, or other devices located on different networks.

Figure 2:
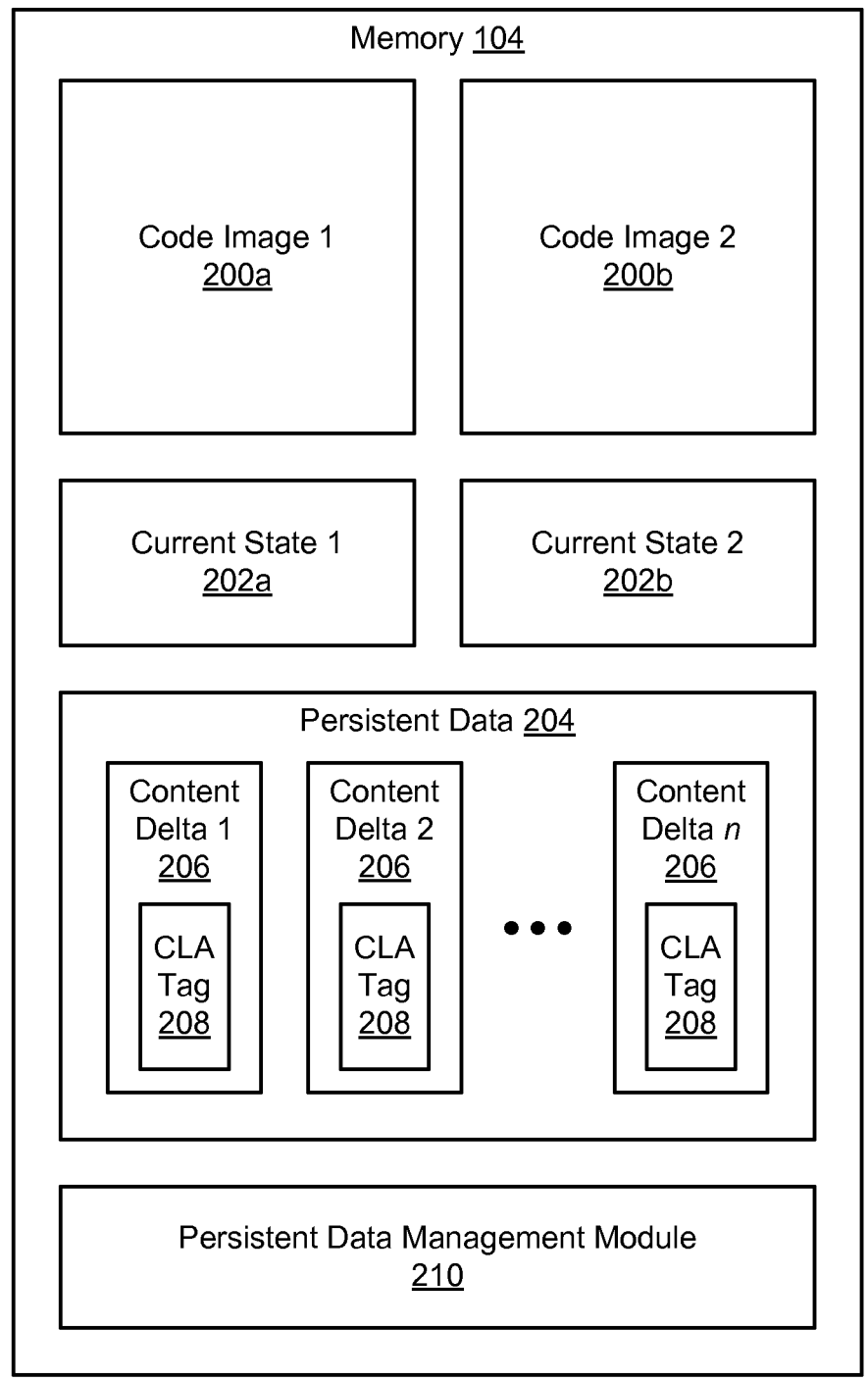
FIG. 2 is a high-level block diagram showing a memory device containing multiple code images, the current state of the code images, persistent data associated with the code images, and a persistent data management module for managing persistent data associated with the code images.

Referring to FIG. 2, in certain embodiments, a computing system 100 like that illustrated in FIG. 1 may be configured to boot or run one of several code images 200a, 200b. These code images 200a, 200b may be stored in a memory 104 of the computing system 100 (such as in a local hard drive 104a or solid state drive 104a of the computing system 100), or in an external storage device, such as a storage device located over a network 116. In certain embodiments, the code images 200a, 200b are located on the same physical storage device, such as on different partitions of a hard drive or solid state drive. In other embodiments, the code images 200a, 200b are located on different physical storage devices, such as on different hard drives or solid state drives. The multi-image configuration illustrated in FIG. 2 includes two images 200a, 200b but may also be expanded to include more than two images 200.

A multi-image configuration such as that illustrated in FIG. 2 may be useful in situations where several pieces of software require different operating systems or supporting applications to operate, thereby allowing the software to run on a single computer. Another reason for using a multi-image configuration is to investigate or test a new operating system or piece of software or firmware without switching completely. For example, such multi-image configurations may allow a user or administrator to get a feel for a new system, configure applications on the new system, and migrate data to the new system before removing the old code image. In some cases the old code image may be retained to provide a fallback position in the event the new code image fails, has problems, does not meet expectation, or if a prior system configuration is needed or desired.

As previously mentioned, multi-image systems have to deal with the issue of "persistent data." Typically, this refers to information specific to a particular system, such as configuration information. However, for the purposes of this disclosure, there is no limitation as to the type of data that can be considered persistent. As previously mentioned, conventional multi-image systems typically maintain a separate copy of persistent data for each code image. This is at least partly due to the fact that each code image may use different persistent data and/or use a different format for the persistent data. For example, some persistent data (e.g., configuration settings) used by a first code image may not be used by a second code image and vice versa. Because two copies of persistent data are maintained, if a parameter (e.g., a configuration setting) associated with a first code level is changed, the change will not be reflected in a second code level even if the second code level has a same or similar parameter.

In order to address the shortcomings of conventional multi-image systems, apparatus and methods in accordance with the invention enable multiple code images 200a, 200b to share a common copy of persistent data 204. Changes to this persistent data 204 are recorded as content deltas 206. These content deltas 206 record the portion of the persistent data 204 that has changed since the last time the persistent data 204 was backed up or recorded.

To address incompatibility issues where persistent data is different for different code levels, the content deltas 206 may be marked to indicate the code levels which the content deltas 206 apply to. This may be accomplished, for example, by marking the content deltas 206 with code-level applicability tags 208. If a parameter is changed in a first code image 200a that only applies to the first code image 200a, then the content delta 206 may be marked with a code-level applicability tag 208 to indicate that the content delta 206 applies to the first code image 200a only. Similarly, if a parameter that is changed in the first code image 200a applies to both the first and second code images 200a, 200b, then the content delta 206 may be marked with code-level applicability tags 208 to indicate that the content delta 206 applies to both the first and second code images 200a, 200b.

The above-described technique allows shared persistent data 204 to be stored in a single repository. The format of the persistent data 204 may be modified as needed to comport with the code image 200 that is currently running, thereby eliminating the problem of incompatibility. Because changes to the persistent data 204 are recorded as content deltas 206, data duplication is minimized. Furthermore, the use of code-level applicability tags 208 allows only applicable content deltas 206 to be applied to a code image 200. The use of content deltas 206 also allows changes to the persistent data 204 to be rolled back to any desired point in time, simply by subtracting selected content deltas 206. Accordingly, in certain embodiments, a current state 202a, 202b is stored for each of the code images 200a, 200b, indicating which content deltas 206 to apply to the code images 200a, 200b in their current state 202. The current state 202 may include all of the applicable content deltas 206 or may include some subset of the applicable content deltas 206.

A persistent data management module 210 may be provided to manage the persistent data 204 for each of the code images 200a, 200b. In the illustrated embodiment, the persistent data management module 210 is provided in the form of software or firmware. Nevertheless, the persistent data management module 210 may be implemented in hardware, software or firmware executable on hardware, or a combination thereof. The function of the persistent data management module 210 will be described in more detail in association with FIG. 3.

Figure 3:
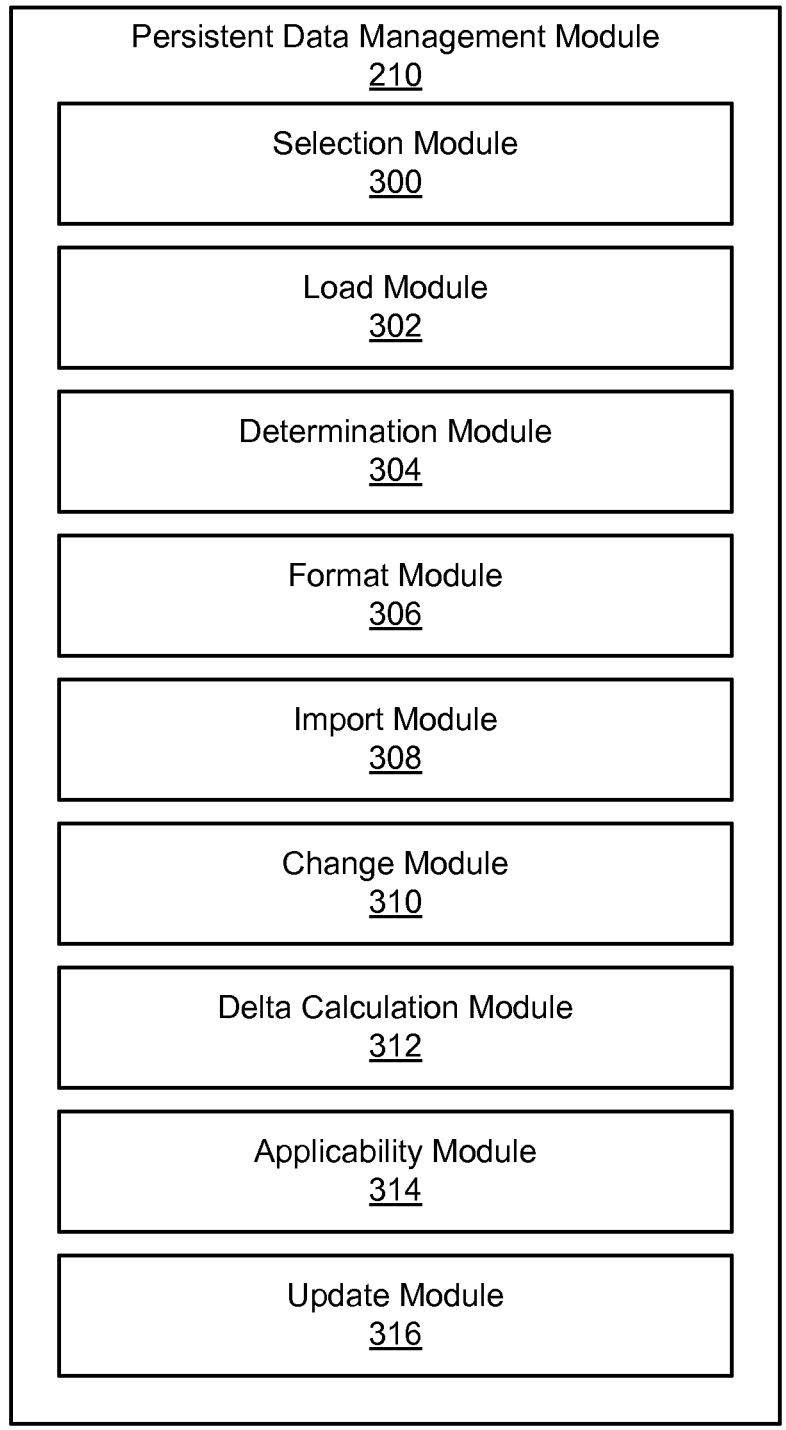
FIG. 3 is a high-level block diagram showing various modules that may be included in a persistent data management module in accordance with the invention.

Referring to FIG. 3, as mentioned above, a persistent data management module 210 may be provided to manage the persistent data 204 for each of the code images 200a, 200b. The persistent data management module 210 may include various sub-modules to provide various features and functions. These sub-modules may include one or more of a selection module 300, load module 302, determination module 304, format module 306, import module 308, change module 310, delta calculation module 312, applicability module 314, and update module 316.

A selection module 300 may be provided to select a particular code image 200 to run on a computing system 100. For example, when starting, restarting, or otherwise booting a computing system 100, the selection module 300 may prompt a user to select a particular code image 200 with which to boot or run on the computing system 100. Upon selecting a code image 200, a load module 302 may load the selected code image 200 into the computing system 100. A determination module 304 may then determine the persistent data 204 that applies to the selected code image 200. This may be accomplished, for example, by determining the current state 202 of the code image 200, and the content deltas 206 that should be included in the code image's persistent data 204 based on the current state 202. This may also include using content deltas 206 that apply to the code image 200 based on the code-level applicability tags 208.

Once the appropriate content deltas 206 are determined based on the current state 202 and the code-level applicability tags 208, a format module 306 may format the persistent data 204 for the selected code image 200. In certain embodiments, the persistent data 204 is stored in a generic format (such as in one or more XML documents or other files) and only converted to a specific format (for a particular code image 200) when the code image 200 is loaded into the computing system 100. Once the persistent data 204 is properly formatted, an import module 308 may import the persistent data 204 into the selected code image 200.

As a code image 200 is used, a change module 310 may monitor changes to the code image's persistent data 204, such as changes to the code image's configuration. The changes may be made manually by a user or automatically by an application or the code image 200 itself. When such changes are detected, a delta calculation module 312 may calculate the content delta 206. As previously explained, the content delta 206 may record changes to the persistent data 204 since the last time the persistent data 204 was saved or backed up (which may be the last time a content delta 206 was generated and saved). An applicability module 314 may determine which code images 200 the changes are applicable to and generate code-level applicability tags 208 for marking the content delta 206 accordingly. An update module 316 may update the persistent data 204 by saving the content delta 206 and associated code-level applicability tags 208, as well as the current state 202 of the code image 200.

Figure 4:
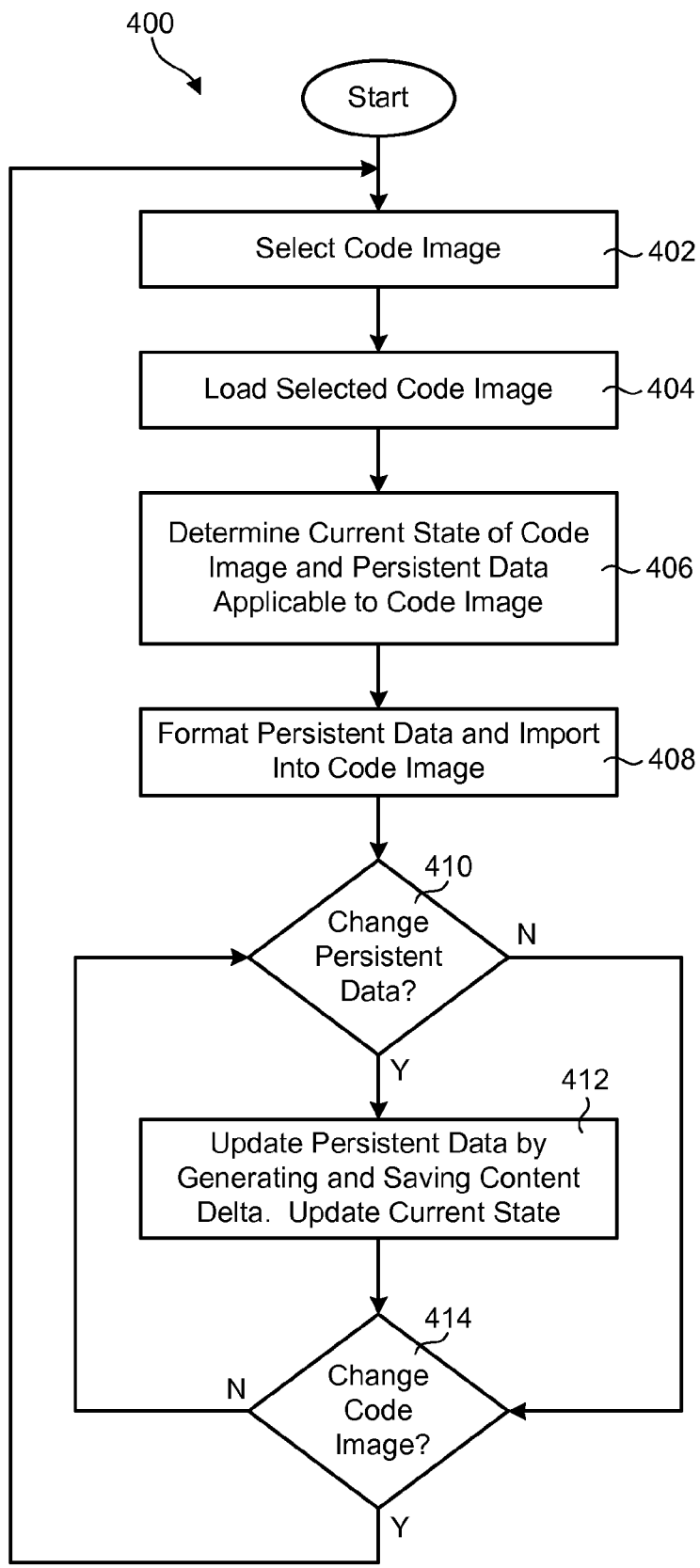
FIG. 4 is a flow diagram showing one embodiment of a method for managing persistent data for multiple code images.

Referring to FIG. 4, one embodiment of a method 400 for managing persistent data 204 associated with multiple code images 200a, 200b is illustrated. As shown, the method 400 initially selects 402 a particular code image 200 to run on a computing system 100. This may include prompting a user to select a particular code image 200 with which to boot the computing system 100 or run on the computing system 100. The method 400 then loads 404 the selected code image 200 into the computing system 100. Upon loading 404 the selected code image 200, the method 400 determines 406 the current state 202 of the selected code image 200 and determines 406 which portions (i.e., content deltas 206) of the persistent data 204 apply to the selected code image 200 based on the current state 202 and the code-level applicability tags 208.

Once the persistent data 204 that applies to the selected code image 200 has been determined 106, the method 400 formats 408 the persistent data 204 for the selected code image 200. This may include converting the persistent data 204 from a generic format to a specific format associated with the selected code image 200. Once the persistent data 204 is formatted properly, the persistent data 204 may be imported 408 into the selected code image 200.

Once the code image 200 is running, the method 400 monitors 410 the code image 200 for changes to the persistent data 204. If a change is detected, the method 400 updates 412 the persistent data 204 by generating 412 a content delta 206 describing the change. Generating 412 the content delta 206 may include generating code-level applicability tags 208 for the content delta 206 that describe the code images 200 which the content delta 206 applies to. The method 400 may then save 412 the content delta 206 and update 412 the current state 202 of the code image 200. If, at step 414, a user or software decides to switch to another code image 200, the method 400 repeats in the manner previously described.

Referring to FIG. 5, a more specific example of calculating a content delta 206 for a particular configuration change is illustrated. In this example, assume that a configuration change is made to the persistent data 204 of a code image 200. In this example, assume that file "A" is modified to create file "A'". A content delta 206 is then computed, such as by subtracting file "A" from file "A'", thereby yielding the changes to file "A". The content delta 206 is labeled "Delta X" in the illustrated example. In this example, assume that Delta X indicates that that an IP address in the current code image 200 has been modified.

The applicability of the change to the code images 200 is then evaluated. In this example, assume that the code images 200 include two code images 200—i.e., Code Level 1.0 and Code Level 2.0. Assume for the sake of example that the change is applicable to both Code Level 1.0 and Code Level 2.0. That is, the persistent data 204 for Code Level 1.0 contains an IP address parameter and the persistent data 204 for Code Level 2.0 also contains an IP address parameter. In certain embodiments, this determination is made by scanning the code images 200 to search for a pattern (e.g., an ASCII or binary pattern) in the code images 200 that indicates that the code images 200 contain the IP address parameter.

Once this determination is made, code-level applicability tags 208 for Code Levels 1.0 and 2.0 are associated with Delta X. On the other hand, if it is determined that the change is only applicable to a single code image 200 (e.g., Code Level 1.0), then a code-level applicability tag 208 will only be created for that code image 200. The current state 202 of the code image 200 may then be saved. The current state 202 provides a link between the current code image 200 and the content deltas 206 that are currently applied to the code image 200.

The above-described technique is advantageous in that it allows only relevant changes to be applied to each code level. For example, if Code Level 2.0 has configuration parameters that are not contained in Code Level 1.0, then changes to these configuration parameters will not be applicable to Code Level 1.0. The above-described technique allows a machine running Code Level 2.0 to revert to Code Level 1.0 while keeping only the changes that are relevant to Code Level 1.0.

The flowcharts and block diagrams in the Figures illustrate the architecture, functionality, and operation of possible implementations of systems, methods, and computer-usable media according to various embodiments of the present invention. In this regard, each step in the flowcharts or block diagrams may represent a module, segment, or portion of code, which comprises one or more executable instructions for implementing the specified logical function(s). It should also be noted that, in some alternative implementations, the functions noted in a step may occur out of the order noted in the Figures. For example, two steps shown in succession may, in fact, be executed substantially concurrently, or steps may sometimes be executed in the reverse order, depending upon the functionality involved. It will also be noted that each step of the block diagrams and/or flowchart illustrations, and combinations of steps in the block diagrams and/or flowchart illustrations, may be implemented by special purpose hardware-based systems that perform the specified functions or acts, or combinations of special purpose hardware and computer instructions.

The invention claimed is:

1. A method for managing persistent data in a multi-image code load system, the method comprising:
   providing first and second code images for loading onto a computing system;
   storing, in a common repository, persistent data that is shared by each of the first and second code images, the persistent data comprising configuration settings for the first and second code images;
   recording, as content deltas, changes to the persistent data by each of the first and second code images, the content deltas describing portions of the persistent data that have changed since the persistent data was last backed up;
   in the event a content delta applies to the first code image, marking the content delta with a code-level applicability tag associated with the first code image and storing the content delta and code-level applicability tag in the common repository;
   in the event a content delta applies to the second code image, marking the content delta with a code-level applicability tag associated with the second code image and storing the content delta and code-level applicability tag in the common repository;
   upon loading the first code image into the computing system, converting the persistent data and content deltas applicable to the first code image into a first format associated with the first code image; and
   upon loading the second code image into the computing system, converting the persistent data and content deltas applicable to the second code image into a second format associated with the second code image.

2. The method of claim 1, further comprising storing the persistent data and content deltas in a file system.

3. The method of claim 1, further comprising scanning the first and second code levels to determine to which of the first and second code images the content deltas apply.

4. The method of claim 1, further comprising storing, for each of the first and second code levels, a current state marker indicating which of the content deltas apply to the code level in its current state.

5. A computer program product for managing persistent data in a multi-image code load system, the computer program product comprising a non-transitory computer-readable storage medium having computer-usable program code embodied therein, the computer-usable program code comprising:

computer-usable program code to alternately load first and second code images into a computing system;

computer-usable program code to manage, in a common repository, persistent data shared by the first and second code images, the persistent data comprising configuration settings for the first and second code images;

computer-usable program code to record, as content deltas, changes to the persistent data by the first and second code images, the content deltas describing portions of the persistent data that have changed since the persistent data was last backed up;

computer-usable program code to, in the event a content delta applies to the first code image, mark the content delta with a code-level applicability tag associated with the first code image and store the content delta and code-level applicability tag in the common repository;

computer-usable program code to, in the event a content delta applies to the second code image, mark the content delta with a code-level applicability tag associated with the second code image and store the content delta and code-level applicability tag in the common repository;

computer-usable program code to, upon loading the first code image into the computing system, convert the persistent data and content deltas applicable to the first code image into a first format associated with the first code image; and computer-usable program code to, upon loading the second code image into the computing system, convert the persistent data and content deltas applicable to the second code image into a second format associated with the second code image.

6. The computer program product of claim 5, further comprising computer-usable program code to store the persistent data and content deltas in a file system.

7. The computer program product of claim 5, further comprising computer-usable program code to scan the first and second code levels to determine to which of the first and second code images the content deltas apply.

8. The computer program product of claim 5, further comprising computer-usable program code to store, for each of the first and second code levels, a current state marker indicating which of the content deltas apply to the code level in its current state.

9. An apparatus for managing persistent data in a multi-image code load system, the apparatus comprising:

at least one processor;

at least one memory device coupled to the at least processor and storing computer instructions for execution on the at least one processor, the computer instructions causing the at least one processor to:

alternately load first and second code images into a computing system;

manage, in a common repository, persistent data shared by the first and second code images, the persistent data comprising configuration settings for the first and second code images;

record, as content deltas, changes to the persistent data by the first and second code images, the content deltas describing portions of the persistent data that have changed since the last time the persistent data was backed up;

in the event a content delta applies to the first code image, mark the content delta with a code-level applicability tag associated with the first code image and store the content delta and code-level applicability tag in the common repository;

in the event a content delta applies to the second code image, mark the content delta with a code-level applicability tag associated with the second code image and store the content delta and code-level applicability tag in the common repository;

upon loading the first code image into the computing system, convert the persistent data and content deltas applicable to the first code image into a first format associated with the first code image; and upon loading the second code image into the computing system, convert the persistent data and content deltas applicable to the second code image into a second format associated with the second code image.

10. The apparatus of claim 9, wherein the common repository is a file system.

11. The apparatus of claim 9, wherein the computer instructions further cause the at least one processor to store, for each of the first and second code levels, a current state marker indicating which of the content deltas apply to the code level in its current state.

\* \* \* \* \*